US010056750B2

(12) United States Patent
Matveev et al.

(10) Patent No.: US 10,056,750 B2
(45) Date of Patent: Aug. 21, 2018

(54) ACTIVE LIGHTNING CONDUCTOR

(76) Inventors: Valery Mikhailovich Matveev, Voronezh (RU); Sergei Valentinovich Nasonov, Voronezh (RU); Yury Valentinovich Pisarevsky, Voronezh (RU)

( * ) Notice: Subject to any disclaimer, the term of this patent is extended or adjusted under 35 U.S.C. 154(b) by 419 days.

(21) Appl. No.: 14/368,001

(22) PCT Filed: Aug. 10, 2012

(86) PCT No.: PCT/RU2012/000658
§ 371 (c)(1),
(2), (4) Date: Dec. 10, 2014

(87) PCT Pub. No.: WO2013/095186
PCT Pub. Date: Jun. 27, 2013

(65) Prior Publication Data
US 2015/0214711 A1    Jul. 30, 2015

(30) Foreign Application Priority Data
Dec. 21, 2011  (RU) .................. 2011152210

(51) Int. Cl.
*H02G 13/00*    (2006.01)
(52) U.S. Cl.
CPC ............. *H02G 13/80* (2013.01); *H02G 13/00* (2013.01)
(58) Field of Classification Search
CPC ................ H02G 13/80; H02G 13/00
(Continued)

(56) References Cited

U.S. PATENT DOCUMENTS 3,087,094 A * 4/1963 Nash ................. H01T 4/20
                                                          361/130
3,099,770 A * 7/1963 Kunkle ................ H01C 7/12
                                                          315/36
(Continued)

FOREIGN PATENT DOCUMENTS

CN          201478768 U    5/2010
RU          2090968 C1     9/1997
(Continued)

*Primary Examiner* — William H Mayo, III
*Assistant Examiner* — Hiram E Gonzalez
(74) *Attorney, Agent, or Firm* — Matthew A. Pequignot; Pequignot + Myers

(57) ABSTRACT

The present invention relates to means for protecting various purpose facilities against damages when they are exposed to an intensive action of atmospheric electricity, in particular to means for protecting buildings and structures against lightning. The active lightning conductor comprises a housing with a cover, an active lightning-receiving unit connected in series to a high-voltage impulse generator excited by an external lightning-induced magnetic field, and to a contact element of a grounding system. The generator comprises at least two charging resistor circuits as well as a multiunit arrester made as at least one capacitive discharge circuit composed of in-line alternating capacitors each of them having two charging plates with arresters. The charging circuit resistors are divided into two groups the resistors of one of them being connected to the upper capacitor plates and the resistors of the second group being connected to the lower capacitor plates. The electromagnetic parameters of the lightning conductor provide for a possibility to charge the capacitors from an external electric field at a critical active lightning voltage of the last until a level sufficient to form and to execute a preventive discharge providing for the formation of a leader sent via the lightning-receiving unit to meet the striking leader from an external lightning, but in (Continued)

this case said capacitor electric capacitance and said ohmic resistance of the interlayers between the capacitor plates and the arrester protrusions are adopted with values providing for the possibility of a reach-through breakdown of the arresters in this circuit and the possibility of a short-circuit of the lightning-receiving unit with the contact element of the grounding system at a lightning discharge. The lightning-receiving unit is made as a multirod rim with a central rod and side rods. The lightning conductor is provided with an external discharge circuit composed of couples of current-carrying arresters. Each arrester of one couple is electrically coupled to one arrester of another couple. One arrester of the upper couple is electrically linked to the lightning-receiving unit, and one arrester of the lower couple is linked to the contact element of the grounding system. The arresters of adjacent couples are located on the housing with a partial shift in the plan view relative to the previous and/or following couple of arresters.

The technical result resides in the improvement of structural, technological and operating performance of the lightning conductor, in the improvement of the device operation reliability and in the provision of improved protection of facilities against damages due to lightning discharge hits.

13 Claims, 2 Drawing Sheets

(58) Field of Classification Search
USPC .................................. 361/117, 120, 127, 128
See application file for complete search history.

(56) References Cited

U.S. PATENT DOCUMENTS

| | | | | |
|---|---|---|---|---|
| 3,733,521 | A * | 5/1973 | Kalb | H01T 4/20 315/36 |
| 4,004,193 | A * | 1/1977 | Reckard | H02H 9/06 361/127 |
| 4,276,578 | A * | 6/1981 | Levinson | H01C 7/112 338/21 |
| 4,326,232 | A * | 4/1982 | Nishiwaki | H01C 7/12 313/231.01 |
| 5,159,521 | A * | 10/1992 | Guangrun | H02G 13/00 361/117 |
| 6,875,915 | B1 * | 4/2005 | Chung | H02G 13/00 135/96 |
| 7,786,377 | B2 * | 8/2010 | Barragan | H02G 13/00 174/2 |

FOREIGN PATENT DOCUMENTS

| | | |
|---|---|---|
| RU | 2101819 C1 | 1/1998 |
| RU | 2186448 C1 | 7/2002 |
| RU | 2208887 C1 | 7/2003 |

* cited by examiner

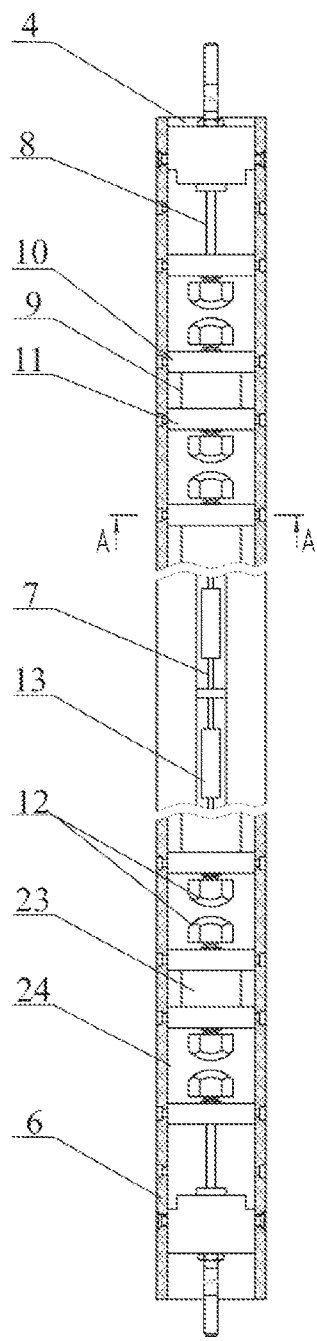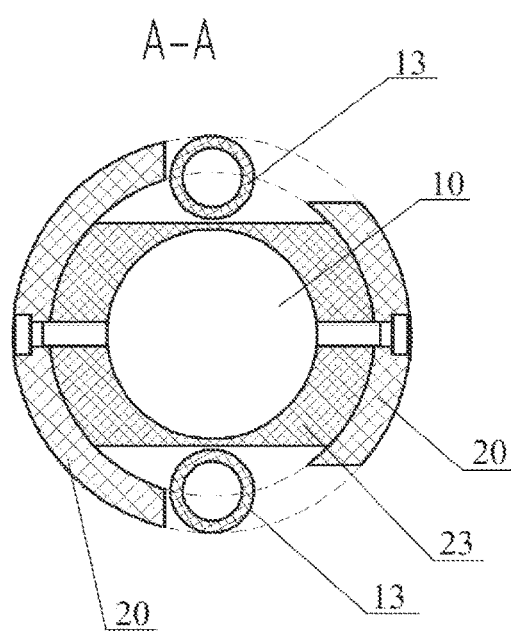
Fig. 3
Fig. 4

ACTIVE LIGHTNING CONDUCTOR

RELATED APPLICATION

This application claims the benefit of PCT/RU2012/000658, which claims priority from RU 2011152210 filed Dec. 21, 2011.

FIELD OF THE INVENTION

The present invention relates to a means protecting various-purposed objects against damages when they are exposed to an intensive action of atmospheric electricity, in particular to a means for protecting against lightning striking industrial buildings and structures as well as electric power equipment located outdoors.

BACKGROUND OF THE INVENTION

A conventional lightning conductor comprises a central vertical grounded rod with some lateral lightning-receiving antennas located symmetrically thereto in combination with a generating electrode, some arresters, a converter of electric field energy, and energy storage units. An arrester is placed in a gap between the central grounded rod and the generating electrode. Similar arresters are located in the gaps of the lateral lightning-receiving antennas. The first input of the energy converter is connected to the generating electrode, the second input of the energy converter is connected to the central grounded rod. The converter outputs are connected to the entries of energy storage units the outputs of which are connected between the grounded rod and the working terminals of respective lateral antennas (patent RU 2090968 C1, published on Sep. 20, 1997). Shortcomings of this known device reside in a high complexity of execution and in a low security of the objects against destruction by lightning.

It is known a lightning conductor comprising a central lightning-receiving rod, a central grounding rod, lateral rods and a housing. The lightning-receiving rod is connected to the beginning of the first secondary winding of several series windings of step-up transformers located inside a multiunit arrester, and to the first unit of the latter, the end of the last secondary winding of the step-up transformers being connected to the last unit of the multiunit arrester, to the first terminal of the generator arrester, to the grounding rod and to the first end of the primary winding of an isolating transformer, the second end of the primary winding being connected to the second terminal of the generator arrester and to the base of the lateral rods, the secondary winding of the isolating transformer and the primary windings of the step-up transformers being connected in parallel (patent RU 2101819 C1, published on Jan. 1, 1998).

An inconvenient of this device resides in the need to select electromagnetic parameters for its operation while a lightning leader of a determined type approaches the object to be protected. Such protection is not secure enough.

It is known a lightning conductor containing a central lightning-receiving rod, a central grounding rod, side rods, an outer multiunit protective arrester, a generator arrester and a dielectric housing. The dielectric housing has an outer cross ribbing. The sections of the multiunit protective arrester are set down on the lateral rods and jut out of the limits of the cross ribbing on the dielectric housing. Inside the dielectric housing there are accumulating units each of them being formed by a chain of an accumulating capacitor and a generator arrester mounted in series. The upper accumulating unit is linked to the lower capacitor plate of the forming capacitor the upper plate of which is linked to the central lightning-receiving rod and to the upper side rods. The junction points of the generator arresters and of the upper capacitor plates are linked to the side rods. The lower plate of the capacitor for the lower accumulating unit is linked to the central grounding rod and to the lower section of the outer multiunit protective arrester (patent (RU 2186448 C1, published on Jul. 27, 2002).

An inconvenient of this known lightning conductor resides in a very low service life and in insufficient reliability of the same due to its construction.

Another conventional lightning conductor comprises a dielectric housing with a cross ribbing, a central lightning-receiving rod, and some side rods fit into the cover of the housing. A central grounding rod is inserted into the housing base. The housing encloses some capacitor plates jointed to inner arresters. The cover is conducting and receives the side rods fit into the same. The housing encloses two chains of resistors connected in series, the number and the nominal values of which are identical in every circuit. The first terminals of the first chain resistors are connected to the upper capacitors plates. The first terminals of the second chain resistors are connected to the lower plates of the capacitors. The arresters are located on the adjacent plates of neighboring capacitors (patent RU 2208887 C1, published on Jul. 20, 2003).

A shortcoming of this known solution is insufficient reliability and insufficient service life of the device.

SUMMARY OF THE INVENTION

The aim of the present invention is to improve the structural, technological and operational performance of the lightning conductor, to improve the reliability and the service life of the device and to provide a better protection of facilities against damages by lightning discharges.

Accordingly, the present invention relates to an active lightning conductor comprising:
a housing with a cover,
an active lightning-receiving unit comprising a system of rods electrically connected to each other with a central rod and side rods, the central rod including a length longer than the side rods;
an external discharge circuit including couples of current-carrying arrester;
a high-voltage impulse generator, and
a contact element of a grounding system,
wherein said high-voltage impulse generator comprising a case, the outer profile of which encloses at least two charging resistor circuits, and a multiunit arrester including at least one capacitive discharge circuit,
wherein the lightning-receiving unit includes a multirod rim, which is mounted on the cover and connected in series to the high-voltage impulse generator and to the contact element of the grounding system,
wherein the housing includes outer bearing flanges;
wherein the current-carrying arresters are attached at the outer bearing flanges, and
wherein one current-carrying arrester of an upper couple of the external discharge circuit is electrically linked to the multi-rod rim of the lightning-receiving unit, and one current-carrying arrester of a lower couple of the external discharge circuit is linked to the contact element of the grounding system.

The case of the impulse voltage generator can be preferably made of at least two channeled plates open in the outer side in the area of the resistor circuit location, at least on a part of their length.

The external arresters can be made as a ball, a ball-like piece.

The external arresters can be made as an ellipsoid.

The couples of arresters of the outer discharge circuit can be shifted successively in a spiral in their height.

The couples of arresters of the outer discharge circuit can be shifted successively in height in staggered rows.

The lightning conductor housing can be provided with outer bearing flanges for attaching arresters, every arrester being provided with a current-carrying bearing element, preferably made with a rod-like and a cantilever bearing sections, and being mounted on the bearing flange with the possibility to control the thickness and the ohmic resistance of the dielectric interlayer in an arrester couple.

The lightning-receiving unit made as a system of rods forming a multirod rim with a central and side rods can be pointed in space onto an area of increased intensity of the external electric field, the radian value of the angular direction and the radial length of the side rods being preferably identical and included into a conventional spherical sector of said external field, the central rod being made with a length superior to that of the side rods and being prolonged at least to the crossing point with a conditional plane tangent to the surface of said conditional spherical sector, this surface being perpendicular to the direction of one of the side rods.

At an even number of resistor circuits in the impulse high-voltage generator, the nominal values and the geometrical parameters of the resistors can be adopted identical for each one of them.

At an uneven number of resistor circuits in the impulse high-voltage generator, that communicate with the upper and with the lower capacitor plates, the resistor ratings, at least in one chain of a group having a lesser number of circuits, can be increased until equalizing the combined ohmic resistance of the resistors communicating with every upper or lower capacitor plate, the geometric height of the resistors being kept equal.

Each resistor of the resistor circuit can be coordinated geometrically to the height range of the similar capacitor plates and the arrester, communicating with the same at the input and the output, by means of the selection or the control of the length of the connecting elements between adjacent resistors.

Each resistor in the resistor circuit can be geometrically coordinated with the height range of the like capacitor plates and the arrester communicating with the same at the input and at the output, the axial length of the resistor being higher than said combined length of these elements of the capacitor and the arrester, thanks to the inclined and crossed arrangement of the resistors relative to the axis of the lightning conductor.

Each resistor in the resistor circuit can be geometrically coordinated with the height range of the like capacitor plates and the arrester communicating with the same at the input and at the output, the axial length of the resistor being higher than said combined length of these elements of the capacitor and the arrester, thanks to an axial shifting in the plan view and to a partial coincidence in the height range of length sections of adjacent resistors.

The interlayers between the capacitor plates, the opposite arrester protrusions and the cavity provided in the lightning conductor for the multiunit arrester can be filled with some dielectric or a system of dielectrics able to self-restoring of initial properties after the device operation, for example, by some inert gas or air, or by a combination of a gaseous and a solid dielectrics.

The technical result provided with the disclosed combination of features resides in the improvement of structural, technological and operating performance of the lightning conductor, in the improvement of the device operation reliability and in the provision of improved protection of facilities against damages due to lightning discharge thanks to a more reliable structural design of arresters, to the mutual arrangement and to the combination of a capacitor discharge circuit and of charging resistor circuits. The external discharge circuit serves to protect the impulse voltage generator against the effect of electric current. At the moment of a lightning hit on the lightning conductor, all the charge runs out by the external arresters, thereby impeding the destructive effect of the lightning on the internal generator, which improves the operational reliability of the lightning conductor and the protection of facilities of various kind in the case of an intensive attack of atmospheric electricity.

BRIEF DESCRIPTION OF THE DRAWINGS

The essence of the present invention is illustrated by the enclosed drawings where:

FIG. 3 shows an impulse voltage generator in a front view with a partial vertical cut-away;

FIG. 4 shows a section A-A of a partial vertical cut-away.

PREFERABLE EMBODIMENT OF THE PRESENT INVENTION

Figure 1:
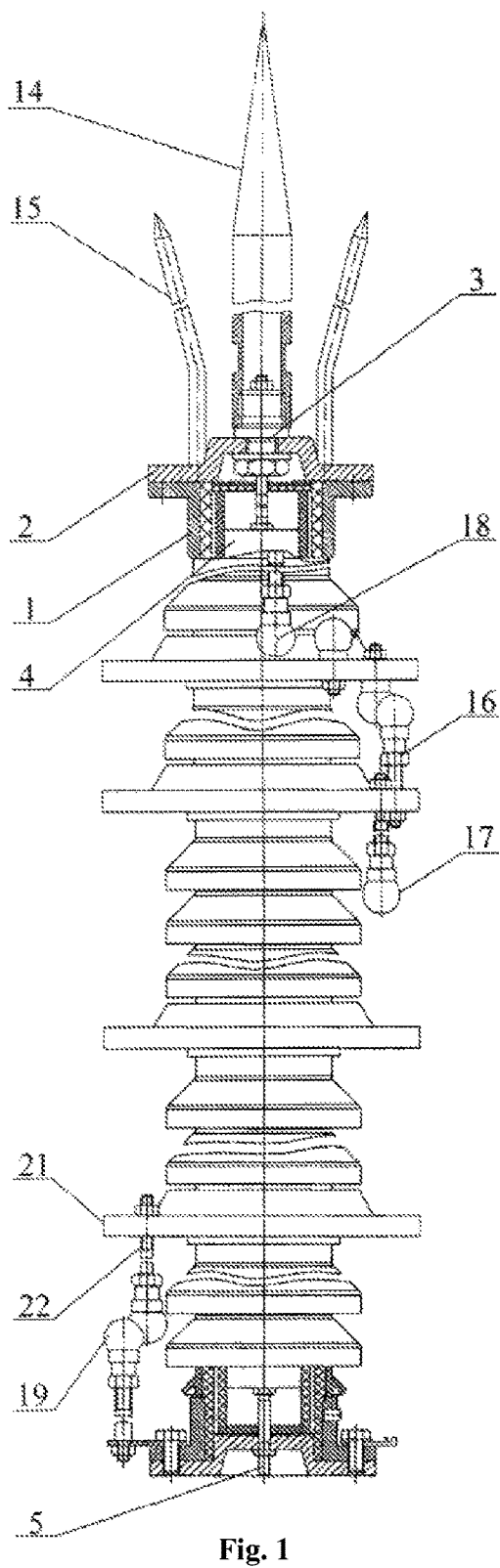
FIG. 1 shows an active lightning conductor in a front view with a partial vertical cut-away.
Figure 2:
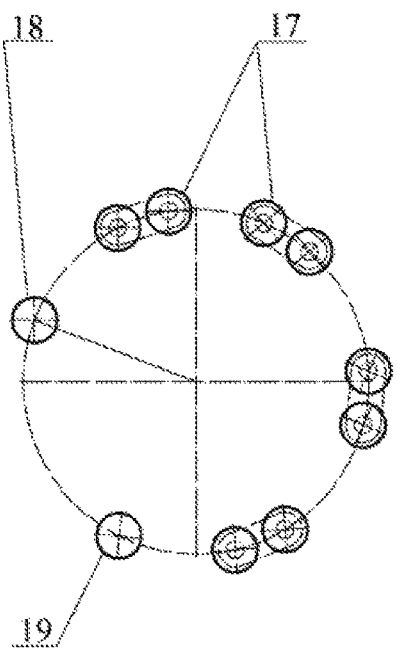
FIG. 2 shows a layout of arresters in an external discharge circuit in a plan view.

The active lightning conductor comprises a housing 1 with a cover 2, an active lightning-receiving unit 3 connected in series to a high-voltage impulse generator 4 excited by an external lightning-induced magnetic field, and to a contact element 5 of the grounding system.

The generator 4 presents a case 6 the outer side of which encloses at least two charging resistor circuits 7 as well as a multiunit arrester made as at least one capacitive discharge circuit 8 composed of in-line alternating capacitors 9. Each capacitor 9 has two charging plates 10, 11, and arresters 12 functionally combined with the same and made as projections of adjusted height on the outer side of said plates 10, 11. The charging resistor circuits 7 are composed of resistors 13 connected in series and divided into two groups. The resistors of one of them are connected to the upper capacitor plates 10 and the resistors of the other group are connected to the lower capacitor plates 11 of the capacitors 9. The combined nominal values of the resistors connected to the upper plates 10 of each capacitor 9 and of the resistors connected to the lower plates 11 of are adopted equal in height and resistance. The ohmic resistance of the resistors 13, of the dielectric interlayers between the opposing arrester 12 elements and the plates 10, 11 of the capacitors 9, the area of the capacitor plates, the number and the capacity of the capacitors 9 in the high-voltage impulse generator are adopted with values providing for charging the capacitors 9 from an external electric field, at least at a critical active lightning voltage of the last until a level sufficient to form and to execute preventive discharge providing for formation of a leader sent via the lightning receiving unit to meet the striking leader from an external lightning. Said capacitor 9 electric capacitance and said ohmic resistance in the interlayers between the capacitor plates and the arrester 12 protrusions are adopted with values providing for the possibility of a reach-through breakdown of the arresters 12 in this circuit and the possibility of a short-circuit of the lightning-receiving unit with the contact element 5 of the grounding system at a lightning discharge, with subsequent self-restoring of the initial properties of the dielectric and of the protection operational capacity of the active lightning conductor.

The lightning-receiving unit 3 is made as a system of rods electrically connected to each other and forming a multirod rim with a central rod 14 and side rods 15. The central rod 14 is made with a length superior to that of the side rods 15.

The lightning conductor is as well provided with at least one discharge circuit 16 composed of couples of current-carrying arresters 17 preferably made as a body of revolution. Every two arresters 17 forming a couple are separated with some dielectric. Every arrester 17 of one couple is electrically coupled to one arrester 17 of the other couple. One arrester 18 of the upper couple is electrically linked to the lightning-receiving unit 3, and one arrester 19 of the lower couple is linked to the contact element 5 of the grounding system. The arresters 17 of adjacent couples are located on the housing 1 with at least a partial shift in the plan view relative to the previous and/or following couple of arresters 17.

The case 6 of the impulse voltage generator 4 is preferably made of at least two channeled plates 20 open in the loop in the areas of the resistor circuit 7 location, at least on a part of their length.

The external arresters 17 are made as a ball, a ball-like piece or an ellipsoid. The couples of arresters 17 of the external discharge circuit 16 are shifted in height in a spiral or successively shifted in height, in staggered rows.

The lightning conductor housing 1 is provided with outer bearing flanges 21 for attaching the arresters 17. Every arrester 17 is provided with a current-carrying bearing element 22, preferably made with a rod-like and a cantilever bearing sections, and is mounted on the bearing flange 21 with the possibility to control the thickness and the ohmic resistance of the dielectric interlayer in the couple of arresters 17.

The lightning-receiving unit 3 is pointed in space on the area of increased intensity of the external electric field. The radian value of the angular direction and the radial length of the side rods 15 are preferably identical and inserted into a conventional spherical sector of said external field. The central rod 14 is made with a length superior to that of the side rods 15 and is prolonged at least to the crossing point with a conditional plane tangent to the surface of said conditional spherical sector, this surface being perpendicular to the direction of one of the side rods 15.

At the even number of resistor circuits 7 in the impulse voltage generator 4, the nominal values and the geometrical parameters of the resistors 13 are adopted identical for each one of them.

At a different number of resistor circuits 7 in the impulse voltage generator 4, that communicate with the upper and with the lower plates 10, 11 of the capacitors 9, the resistor ratings, at least in one chain of a group having a lesser number of circuits, are increased until equalizing the combined ohmic resistance of the resistors communicating with every upper or lower capacitor plate, respectively 10 or 11 of the capacitor 9, the geometric height of the resistors 13 being kept equal.

Each resistor 13 in the resistor circuits 7 is coordinated geometrically to the height range of the similar plates 10, 11 of the capacitor 9 and the arrester 12 communicating with the same at the input and at the output, by means of the selection or the control of the length of the connecting elements between adjacent resistors.

Each resistor 13 in the resistor circuits 7 is geometrically coordinated with the height range of the similar plates 10, 11 of the capacitor 9 and the arrester 12 communicating with the same at the input and at the output, with the axial length of the resistor superior to said combined length of the elements of the capacitors 9 and of the arrester 12, thanks to the inclined and crossed arrangement of the resistors 13 relative to the axis of the lightning conductor.

Each resistor 13 in the resistor circuits 7 is geometrically coordinated with the height range of the like plates 10, 11 of the capacitor 9 and the arrester 12 communicating with the same at the input and at the output, the axial length of the resistor being higher than said combined length of these elements of the capacitor 9 and of the arrester 12, thanks to an axial shifting in the plan view and to a partial coincidence in the height range of length sections of adjacent resistors.

The interlayers 23 between the plates 10, 11 of the capacitor 9, the opposite arrester 12 protrusions and a cavity 24 provided in the lightning conductor for the multiunit arrester is filled with some dielectric or a system of dielectrics able to self-restoring of initial properties after the device operation, for example, by some inert gas or air, or by a combination of a gaseous and a solid dielectrics.

The operation of the lightning conductor is carried out as follows.

At the phase of a leader formation in the lightning, the central rod 14 of the lightning-receiving unit 3 and the side rods 15 are polarized until a corona discharge is formed on the same. The corona discharge current charges the capacitors 9 until obtaining a voltage established by a discharge gap on the arresters 12. At the moment when the lightning leader approaches the lightning conductor, the electric field strength increases, which actuates the lowest arrester 12. A spark discharge links in series two lowest capacitors 9, which results in the jump increase of the voltage to a double disruptive voltage value on the next arrester 12. All the capacitors 9 are connected in series. On the central rod 14 of the lightning-receiving unit 3, a high-voltage impulse appears. The high-voltage impulses initiate a rising counter flow leader that rushes up to meet the descending lightning leader to form a conducting channel serving to provide the main discharge of the lightning. Following the conducting channel, the lightning energy is "grounded" to the earth via the arresters of the external discharge circuit 16, protecting the elements of the generator 4 against disintegration by the lightning discharge currents, and, in this way, the facility is protected against hits by lightning.

Since the interlayer 23 between the plates 10, 11 of the capacitors 9, and the counter flow protrusions of the arresters 12, as well as the cavity 24 in the lightning conductor where the multiunit arrester is located are filled with some self-restoring dielectric material, all the properties of the device are restored after the discharge. The lightning conductor responds both to a negative lightning leader and to a positive lightning leader.

The lightning conductor 3, besides the central rod 14, has side rods 15 mounted at an angle to the horizontal, and a high-voltage impulse is formed at each end of the rods, therefore, each side rod 15 represents an additional lightning conductor increasing the efficiency of the active lightning conductor according to the present invention.

The electromagnetic parameters of the lightning conductor are selected in order to provide its operation at the approach of the lightning leader to the approximate altitude of 182-455 m, in phase with the action of the last.

The invention claimed is:

1. An active lightning conductor, comprising a housing with a cover and outer bearing flanges,
   an active lightning-receiving central rod mounted on the cover and side rods,
   an external discharge circuit composed of couples of current-carrying arresters,
   a high-voltage impulse generator mounted within the housing, and
   a contact element of a grounding system,
   wherein said high-voltage impulse generator comprises a case, wherein the case is in the housing,
   wherein the outer profile of the case encloses at least two charging resistor circuits and a multiunit arrester including at least one capacitive discharge circuit, and a cavity where the multiunit arrester is located in the case is filled with a dielectric material,
   wherein all the side rods are active lightning-receiving rods mounted on the cover and all active lightning-receiving rods form a multirod rim connected in series to the high-voltage impulse generator and to the contact element of the grounding system,
   wherein the current-carrying arresters are mounted at the outer bearing flanges of the housing, and
   wherein only one current-carrying arrester of an upper couple of the external discharge circuit is electrically linked to the multirod rim, and only one current-carrying arrester of a lower couple of the external discharge circuit is linked to the contact element of the grounding system.

2. The active lightning conductor of claim 1, wherein the case of the high-voltage impulse generator is comprised of at least two channeled plates open in the outer part in an area of the resistor circuit, at least on a part of a length thereof.

3. The active lightning conductor of claim 1, wherein the current carrying arresters comprise a ball or a ball-like piece.

4. The active lightning conductor of claim 1, wherein the current carrying arresters comprise an ellipsoid.

5. The active lightning conductor of claim 1, wherein the couples of current carrying arresters of the external discharge circuit are shifted in height in a spiral.

6. The active lightning conductor of claim 1, wherein the couples of current carrying arresters of the external discharge circuit are shifted successively in height in staggered rows.

7. The active lightning conductor of claim 1, wherein every current carrying arrester includes a current-carrying bearing element, comprising rod-like and cantilever bearing sections, and being mounted on the bearing flange for controlling a thickness and ohmic resistance of a dielectric interlayer in each couple of the current-carrying arresters.

8. A method of utilizing the active lightning conductor of claim 1, comprising pointing the active lighting conductor into space into an area of increased intensity of external electric field, wherein a radian value of an angular direction and a radial length of the side rods are identical and inserted into a conditional spherical sector of said external field, wherein the central rod comprises a length longer than the side rods and extends at least to a crossing point with a conditional plane tangent to a surface of said conditional spherical sector, wherein the surface is perpendicular to a direction of one of the side rods.

9. The active lightning conductor of claim 1, wherein the high-voltage impulse generator comprises an even number of charging resistor circuits, wherein nominal values and geometrical parameters of the resistors are identical for each one of the charging resistor circuits.

10. The active lightning conductor of claim 1, wherein the high-voltage impulse generator comprises an uneven number of charging resistor circuits, that communicate with upper and with lower capacitor plates, wherein resistor ratings, at least in one chain of a group having a lesser number of circuits, are equal to a combined ohmic resistance of the resistors communicating with the upper or lower capacitor plate, and wherein geometric heights of the resistors are equal.

11. The active lightning conductor of claim 1, wherein each resistor in the charging resistor circuit is inclined relative to an axis of the lightning conductor to equalize in height with corresponding capacitor plates in the capacitive discharge circuit and current-carrying arrester.

12. The active lightning conductor of claim 1, wherein each resistor in the charging resistor circuit is axially shifted in plan view to equalize in height with corresponding capacitor plates and current-carrying arrester.

13. The active lightning conductor of claim 1, wherein each capacitive discharge circuit comprises:
   interlayers between capacitor plates,
   opposite arrester protrusions, and
   a cavity filled with dielectric or with a system of dielectrics capable of self-restoring initial properties after operation.

* * * * *